United States Patent [19]
Mikesell

[11] 3,731,522
[45] May 8, 1973

[54] METHOD AND APPARATUS FOR DETERMINING OXYGEN CONSUMPTION RATE IN SEWAGE

[75] Inventor: Ritchie D. Mikesell, Anaheim, Calif.

[73] Assignee: Robertshaw Controls Company, Richmond, Va.

[22] Filed: Sept. 30, 1970

[21] Appl. No.: 77,266

[52] U.S. Cl. ..................73/19, 261/93, 261/122, 23/230 R, 23/253 R, 210/96
[51] Int. Cl. ..............................G01n 27/26
[58] Field of Search............................73/19, 23, 53; 210/96, 220, 221; 261/26, 27, 64, 122, 123, 93; 23/1 E, 230 R, 230 B, 230 PC, 230 M, 232 R, 232 E, 253 R, 253 A, 254 E, 255 E

[56] References Cited

UNITED STATES PATENTS

| | | | |
|---|---|---|---|
| 3,028,011 | 4/1962 | McGivern | 210/220 |
| 3,236,384 | 2/1966 | Sontheimer et al. | 210/220 X |
| 3,342,727 | 9/1967 | Bringle | 210/96 X |
| 3,348,409 | 10/1967 | Arthur | 73/19 |
| 3,510,407 | 5/1970 | Stack | 23/230 R |
| 3,557,954 | 1/1971 | Welch | 210/96 X |

OTHER PUBLICATIONS

Farkas, "Method for Measuring Aerobic Decomposition Activity of Activated Sludge in an Open System" –Advances in Water Pollution Research, 4th International Con'f. – Prague, April 21–25, 1969–(Jenkins, ed.), Pergamon Press, London, December 4, 1969–pp. 309–317, 319–327.

Primary Examiner—Richard C. Queisser
Assistant Examiner—C. E. Snee, III
Attorney—Fulwider, Patton, Rieber, Lee & Utecht

[57] ABSTRACT

A continuous respirometer apparatus for measuring the rate at which oxygen in a fluid, such as sewage, is consumed to thereby obtain an indication of the respiration rate of the bacterial population included in such sewage. The apparatus includes a closed air-tight container having an inlet and an outlet. Inlet oxygen sensing means is provided for sensing the amount of dissolved oxygen in the fluid entering the container and outlet oxygen sensing means is provided for sensing the amount of oxygen in the sewage exhausted out the outlet. Pump means is provided for circulating the sewage through the closed container at a constant flow rate whereby the amount of dissolved oxygen in the sewage may be determined at both the inlet and outlet to thereby enable the operator to determine the rate at which such oxygen is consumed or respired by the bacteria included in the sewage.

9 Claims, 2 Drawing Figures

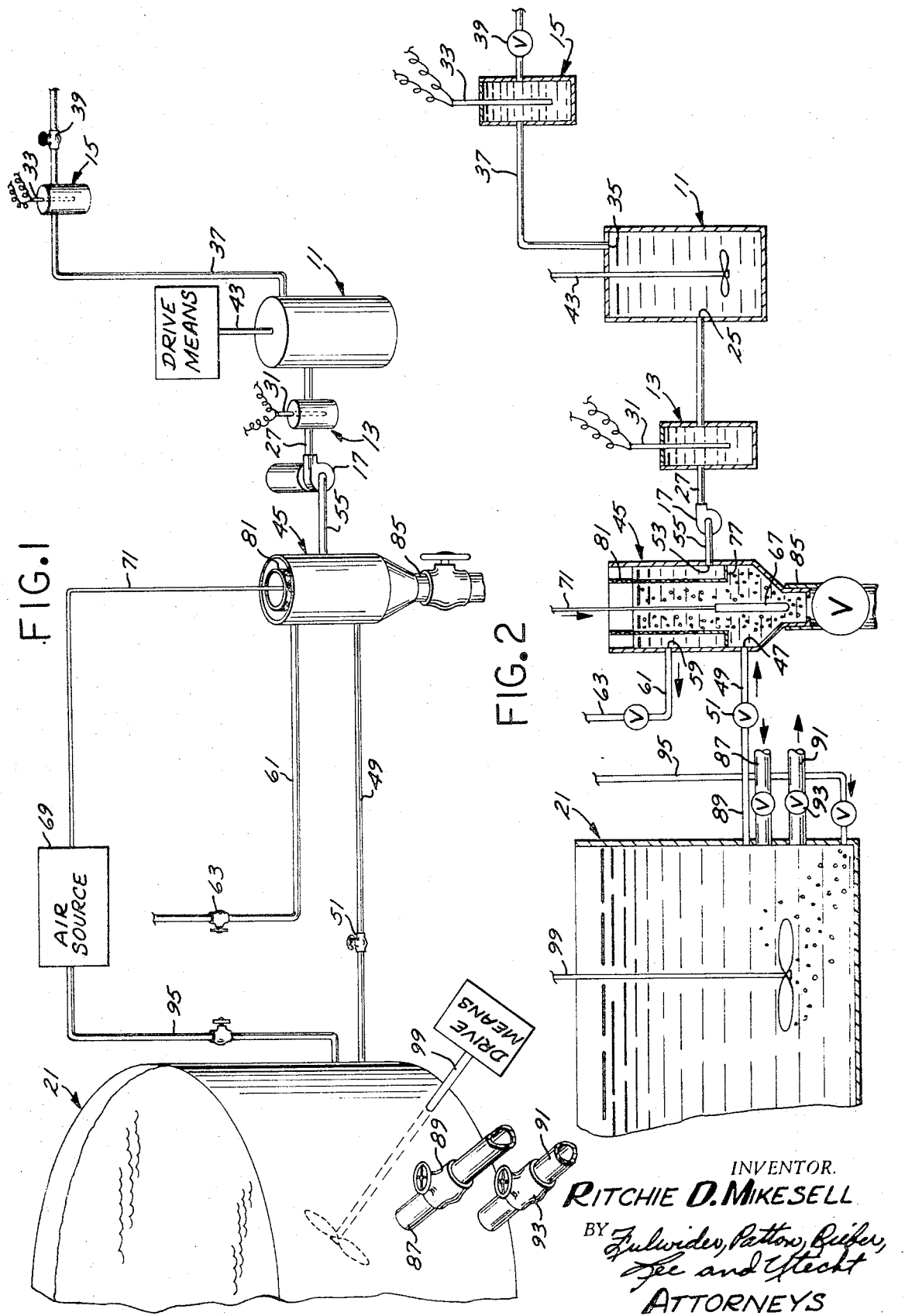

METHOD AND APPARATUS FOR DETERMINING OXYGEN CONSUMPTION RATE IN SEWAGE

BACKGROUND OF THE INVENTION

1. Field of the Invention

The continuous respirometer apparatus of present invention relates to a device for determining the rate of bacterial respiration in sewage or other bacteria-containing fluid.

2. Description of the Prior Art

In the processing of sewage it is desirable to hold the sewage in a processing tank until the bacteria have consumed enough of the bacteria food included in such sewage to assure that bacteria will not multiply to an unacceptable high density when such sewage is released into a disposal area such as a stream or lake. If the sewage is released prematurely the bacteria remaining therein will multiply rapidly and consume the oxygen in the lake or stream and if the respiration rate of the bacteria in such lake or stream exceeds the rate at which oxygen is absorbed into the lake or stream from the surface thereof, the dissolved oxygen therein will be reduced to zero thereby causing every animal in such lake or stream to die, thus producing a dead body of water. Accordingly, it is desirable to maintain the sewage in a treatment tank until the respiration rate of the bacteria contained therein is reduced below a predetermined level but to avoid retaining such sewage for an excessive period of time to thereby maintain the costs of treatment thereof relatively low.

It has been common practice to measure the rate of oxygen consumption in activated sludge to determine the rate of bacterial growth. Probably the most common method of measuring the bacterial activity is the 5-day biological oxygen demand (B.O.D.) test which involves taking samples of activated sludge from sewage aeration tanks and testing such samples at the beginning and end of a 5-day period to determine the rate of consumption of dissolved oxygen. However, a procedure of this type is unduly time-consuming and does not provide a sufficiently rapid result to enable alteration of processing of the sewage in sufficient time to have any substantial effect on the quality of the effluent. Further, the 5-day B.O.D. test requires that the sample be incubated at average sewage temperature for 5 days, seeded, and buffered to closely simulate the actual conditions of the sewage thereby requiring considerable effort and time.

In attempt to overcome these shortcomings, efforts have been made to take batch samples of sewage from aeration tanks and at periodic intervals and determine the content of dissolved oxygen in such batch samples to thereby obtain a determination of the rate at which the dissolved oxygen is being consumed by the bacteria population in the sewage. However, such systems suffer the shortcoming that the results do not provide a continuous indication of the actual rate of consumption of dissolved oxygen.

Additionally, systems have been proposed which incorporate a sensing chamber having a dissolved oxygen probe disposed therein. Such chamber may be filled with sludge and the oxygen content thereof measured at the beginning and end of a predetermined time period. A system of this type is disclosed in a paper by Mr. R. Knop entitled "A New Approach to Measurement of Oxygen Transfer Rates in Operating Activated Sludge Plants," MS. Thesis, Dept., Civil Eng., Michigan State Univ., East Lansing, Michigan (1968). However, systems of this type fail to provide a direct readout of the rate at which the dissolved oxygen is being consumed.

SUMMARY OF THE INVENTION

The continuous respirometer apparatus of present invention is characterized by a closed air-tight container having an inlet and outlet and means for pumping fluid therethrough at a constant rate. Oxygen sensing means is provided at the inlet and outlet to the closed container for sensing the amount of dissolved oxygen in the fluid pumped therethrough whereby the rate of reduction of dissolved oxygen in such fluid may be continuously monitored.

An object of the present invention is to provide a continuous respirometer apparatus of the type described which provides an immediate indication of the rate at which oxygen is being consumed in the fluid.

Another object of the present invention is to provide a continuous respirometer apparatus f the type described which is economical to manufacture and convenient to operate.

These and other objects and the advantages of the present invention will become apparent from a consideration of the following detailed description when taken in conjunction with the accompanying drawing.

DESCRIPTION OF THE DRAWING

FIG. 1 is a perspective view of a continuous respirometer apparatus embodying the present invention; and FIG. 2 is a schematic view of the continuous respirometer apparatus shown in FIG. 1.

DESCRIPTION OF THE PREFERRED EMBODIMENT

The continuous respirometer apparatus of the present invention includes, generally, a closed container 11, an upstream oxygen sensing device 13 disposed at the inlet thereof and a downstream oxygen sensing device 15 disposed at the outlet thereof. A pump 17 is provided for circulating sewage through such closed container 11 at a constant rate to maintain such container entirely filled whereby the oxygen content in the sewage may be determined both at inlet and outlet to thereby provide an indication of the rate at which such oxygen is being consumed by the bacterial population in such sewage.

In the processing of sewage, the sewage is normally subjected to primary treatment where the solids settle out and is then subjected to secondary treatment where it is held in an open sewage processing tank, similar to the tank generally designated 21, to enable the bacteria in such sewage to consume a sufficient amount of the organic matter therein to assure that there is insufficient bacteria food in the waste dumped from such tank to support any undue increase in bacteria population density in the lake or stream into which such water is dumped. The continuous respirometer apparatus of present invention is particularly useful for monitoring the respiration rate of the bacteria population in the sewage held in such tank 21.

The closed vessel 11 icludes an inlet 25 having an inlet conduit 27 connected therewith. The inlet conduit 27 includes the inlet oxygen sensing device 13 and the constant rate circulation pump 17. The pump 17 should be of the type which will pump rather heavy bacteria containing sludge and the like.

The inlet and outlet oxygen sensing devices 13 and 15 include respective electrodes 31 and 33 which are submerged in the sewage to detect the amount of dissolved oxygen therein.

The closed vessel 11 is formed in its upper wall with an outlet 35 which has an outlet conduit 37 connected therewith. The outlet conduit 37 has the outlet oxygen sensing device 15 installed therein and includes a control valve 39 for controlling the dumping of sewage from such vessel. An agitator 43 is provided for agitating the sewage in the vessel 11 to maintain such sewage thoroughly mixed and prevent stratification thereof.

In order to obtain a true indication of the rate of consumption of dissolved oxygen in the sewage passed through the closed vessel 11, there must be sufficient oxygen in the sewage introduced thereto to assure that sufficient oxygen remains therein throughout the residence time in the vessel 11 to support the bacterial population respiration. To provide means for raising the oxygen content of such sewage, a pre-aeration container, generally designated 45, is interposed between the sewage treatment tank 21 and the closed vessel 11. The pre-aeration container 45 includes an inlet 47 which is connected with the treatment tank 21 by means of an inlet conduit 49 which includes a control valve 51. The container 45 also includes a sample receiving outlet 53 which is connected with the respirometer circulation pump 17 by means of a conduit 55. A waste outlet 59 has a waste conduit 61 connected therewith and such conduit includes a control valve 63.

An air diffuser 67 is disposed in the aeration container 45 and is connected with an air pump 69 by means of an air hose 71.

Telescoped within the container 45 is an annular solid wall baffle 75 which surrounds the diffuser 67 and is formed on its lower extremity with a radially outwardly projecting flange 77 which is removably securely to the side wall of the container 11.

An annular course-weave screen 81 is telescoped within the upper portion of the pre-aeration container 45 and is welded on its lower end to the upper end of the baffle 75 to filter excessively large solids out of the sewage passed therethrough for collection in the lower portion of such container for removal through a cleaning hose 85.

The sewage treatment tank 21 normally includes an inlet connected with a sewer line 87 which may include a control valve 89. The outlet from the sewage tank 21 is connected with a waste line 91 which may have a control valve 93 therein. Normally an air conduit 95 leads to the lower portion of such tank so air from the blower 69 may be introduced to the lower portion of such tank for aeration of the sewage therein. Also, an agitator 99 is normally provided for agitating the sewage in the tank 21 to prevent stratification thereof.

In operation, sewage is introduced to the sewage treatment tank 21 through the sewer line 87 and is exhausted from such tank through the waste line 91. The respective inlet and outlet valves 89 and 93 may be adjusted to determine the residence time of such sewage in the tank 21.

It has been determined that if the oxygen content is above 0.5 parts per million (ppm), there is sufficient oxygen to support the bacteria but if the oxygen content drops below that level, the bacteria will become less active. Accordingly, if it is determined that the oxygen content from the closed respirometer vessel 11 is below about 0.5 ppm, the sewage should be pre-aerated in the pre-aeration container 45 to assure that the bacteria remain active so an accurate result can be obtained.

When the pre-aeration chamber 45 is utilized, the valve 51 thereto will be opened to introduce sewage to such container and the blower 69 is energized to diffuse air bubbles out the diffuser 67 for circulation upwardly through sewage in such container to raise the level of dissolved oxygen in such sewage. The solid wall baffle 75 blocks direct entry of any air bubbles from the diffuser 67 into the sample outlet 53. Further, all sewage exhausted out the pre-aeration chamber outlet ports 53 and 59 must pass through the screen 81 to filter pieces of solid therefrom to prevent plugging of such ports while permitting bacteria-containing sludge and the like to pass on to the closed respirometer vessel 11 to assure testing of a representative portion of the sewage.

The pre-aerated sewage from the pre-aeration container 45 is drawn through the circulation pump 17 at a constant rate and passed through the inlet oxygen sensing device 13 to obtain an indication of the amount of dissolved oxygen in such sewage. The sewage in the closed respirometer vessel 11 is agitated by the agitator 43 to maintain such sewage thoroughly mixed and prevent stratification thereof. Sewage is forced from the respirometer vessel 11 through the outlet 35 and past the outlet oxygen sensing device 16 to obtain measurement of the amount of dissolved oxygen still contained therein. It is important that the closed vessel outlet 35 is located in the top wall of such vessel so any air trapped therein may be easily flushed out to maintain such vessel full of sewage and, also, to assure that such air will not remain in the sewage and produce an incorrect reading at the outlet sensing device 15.

Since the volume of the closed container 11 is known and the pumping rate of the circulation pump 17 is constant, the residence time in the respirometer vessel 11 may be determined and the bacterial respiration rate calculated. If such respiration rate, when corrected to compensate for the dilution of such sewage which results when it is dumped into a receiving lake or stream, exceeds the rate at which oxygen is absorbed into such lake or stream, continued dumping of such waste will cause the dissolved oxygen content of such water to decrease. If such dumping is continued for any extended period of time, the dissolved oxygen content will eventually go to zero, thereby resulting in all the surrounding animal life being killed.

However, by adjusting the sewage residence time in the secondary tank 21, the bacteria contained in such sewage will consume a greater amount of the organic matter, or bacteria food, to thereby decrease the amount of food remaining and decrease the respiration rate of such bacteria. When the bacterial respiration rate in the sewage, when corrected to compensate for the dilution which will take place when such sewage is dumped into a receiving body of water, is lowered below the rate of oxygen absorption into such body of water, it will then be safe to dump such waste because the dissolved oxygen in such water will be sufficient to support the remaining bacterial population without danger of any undue decrease in the dissolved oxygen contained in such water.

It should be noted that the flow rate of the sewage to the closed respirometer vessel should be maintained relatively high as compared with the residence time in the aeration container to thereby assure that the primary portion of the consumption of oxygen takes place in such vessel.

Also, if the respirometer vessels and conduits are made of opaque material, the growth of algae and the like will be reduced.

From the foregoing it will be appreciated that the respirometer apparatus of present invention provides convenient means for directly measuring the bacterial population respiration rate in sewage or the like to thereby determine if such sewage is safe for dumping in a stream or lake. Further, such apparatus may be utilized for measuring the bacterial population respiration rate of such lake or stream to enable comparison of such respiration rate with the natural re-aeration rate of such lake or stream to determine if the dissolved oxygen content of such lake or stream is being reduced by the bacterial respiration.

Various modifications and changes may be made with regard to the foregoing detailed description without departing from the spirit of the invention.

What is claimed is:

1. Continuous respirometer apparatus for monitoring the oxygen content of sewage held in a sewage holding area, comprising:
   closure means formed with a continuous closed flow path formed on its upstream and with an inlet sensing area and on its downstream end with an outlet sensing area and defining residence chamber means having a known volume;
   a pre-aeration vessel having an outlet connected with said inlet in said closure means and an inlet for receiving said fluid;
   means for introducing oxygen to said preaeration vessel to add oxygen to said fluid;
   inlet and outlet oxygen content sensing probes disposed in said respective inlet and outlet sensing areas for continuously sensing the oxygen content in said sewage as it flows through said respective inlet and outlet areas;
   supply conduit means leading from said holding area to said pre-aeration vessel inlet for delivering sewage to said vessel;
   dump conduit means leading from said outlet sensing area; and
   sewage delivery means for continuously delivering sewage to said inlet sensing area at a predetermined rate to maintain said known volume filled and to provide a known dwell time required for said sewage to flow from said inlet probe to said outlet probe whereby said sewage delivery means may be actuated to continuously deliver to said inlet sensing area and cause said sewage to flow from said inlet probe to said outlet probe while being isolated from ambient oxygen and causing said probes to give an indication of the oxygen content in said sewage at both said inlet and outlet sensing area.

2. Continuous respirometer apparatus as set forth in claim 1 that includes:
   agitation means in said closure means for agitating said fluid to prevent stratification thereof.

3. Continuous respirometer apparatus as set forth in claim 1 wherein:
   said outlet is formed in the top wall of said container to cause any air or gas trapped in said fluid to be expelled therethrough.

4. Continuous respirometer apparatus as set forth in claim 1 wherein:
   said pre-aeration container includes screen means for blocking passage of solids to the outlet thereof.

5. Continuous respirometer apparatus as set forth in claim 1 wherein:
   said pre-aeration container includes baffle means for blocking direct passage of oxygen from said aeration means to the outlet of said aeration container.

6. Continuous respirometer apparatus as set forth in claim 1 wherein:
   said sewage delivery means includes pump means connected with said supply conduit means.

7. A method of continuously monitoring the oxygen demand of secondary sewage being held in a holding area for subsequent release, comprising:
   continuously flowing said sewage from said holding area at a constant rate to the inlet of a closed flow path defined by a residence container that is closed to the atmosphere and has a known volume and terminating at its downstream end in an outlet;
   aerating said sewage before entry into said residence chamber sufficiently to maintain the oxygen content at said downstream end above about 0.5 P.P.M;
   dumping sewage from said outlet in a dump area;
   continuously measuring the oxygen content of said sewage at the upstream end of said closed, known volume; and
   continuously measuring the oxygen content of said sewage at the downstream end of said closed, known volume whereby the difference between the upstream and downstream indications of oxygen content will be representative of the entire oxygen consumed by the bacterial population in said sewage during the tino lapse required for said sewage to flow between said upstream and downstream ends at said constant rate of flow.

8. The method as set forth in claim 7 that includes:
   the step of screening said sewage before it is introduced to said residence container.

9. The method as set forth in claim 7 that includes:
   the step of screening said sewage before it is introduced to said residence container.

* * * * *